W. S. HAMM.

LANTERN.

APPLICATION FILED FEB. 20, 1911.

Reissued Nov. 28, 1911.

13,323.

2 SHEETS—SHEET 1.

Witnesses
Milton Lenoir
E. M. Klatcher

Inventor
William S. Hamm.
By Fielson & Fielson
Attorneys

W. S. HAMM.

LANTERN.

APPLICATION FILED FEB. 20, 1911.

Reissued Nov. 28, 1911. 13,323.

2 SHEETS—SHEET 2.

Witnesses

Milton Lenoir

E. M. Klatcher

Inventor

William S. Hamm,

By Gilson & Gilson

Attorneys

UNITED STATES PATENT OFFICE.

WILLIAM S. HAMM, OF HUBBARD WOODS, ILLINOIS, ASSIGNOR TO THE ADAMS & WESTLAKE COMPANY, A CORPORATION OF ILLINOIS.

LANTERN.

13,323. Specification of Reissued Letters Patent. Reissued Nov. 28, 1911.

Original No. 910,673, dated January 26, 1909, Serial No. 397,012. Original Reissue No. 12,995, dated July 27, 1909, Serial No. 500,781. Application for this reissue filed February 20, 1911. Serial No. 609,846.

*To all whom it may concern:*

Be it known that I, WILLIAM S. HAMM, a citizen of the United States, and resident of Hubbard Woods, county of Cook, and State of Illinois, have invented certain new and useful Improvements in Lanterns, of which the following is a specification, and which are illustrated in the accompanying drawings, forming a part thereof.

The invention relates to lanterns especially adapted for the use of trainmen, and has for its object the improvement of the ventilating dome of lanterns of this general type; and it consists in the structure hereinafter described, and which is illustrated in the accompanying drawings, in which—

Figure 1:
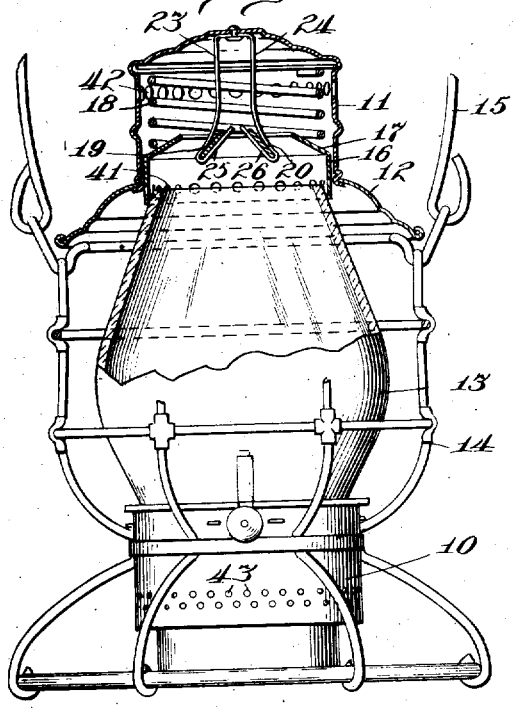
Figure 5:
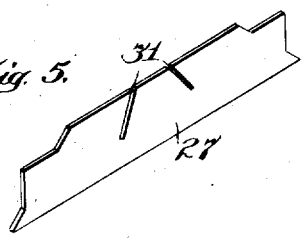
Figure 6:
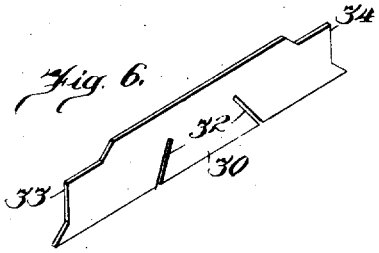
Figure 4:
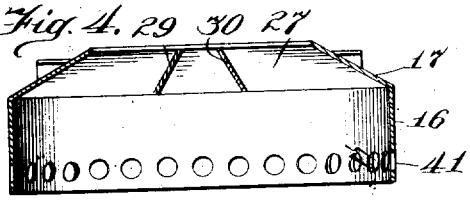
Figure 7:
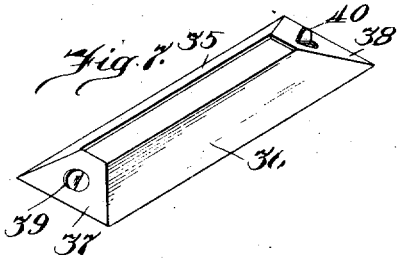
Figure 3:
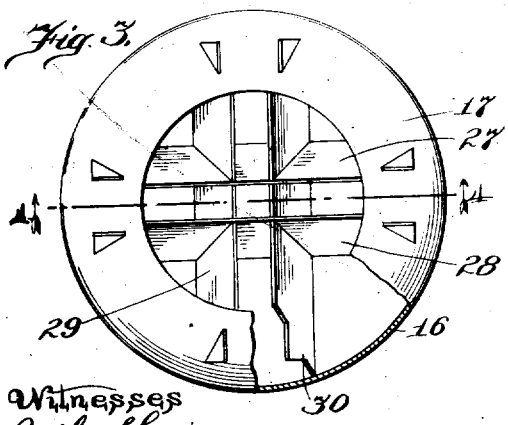
Figure 2:
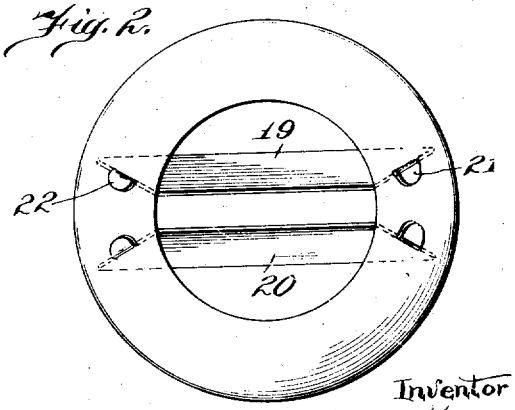
Figure 8:
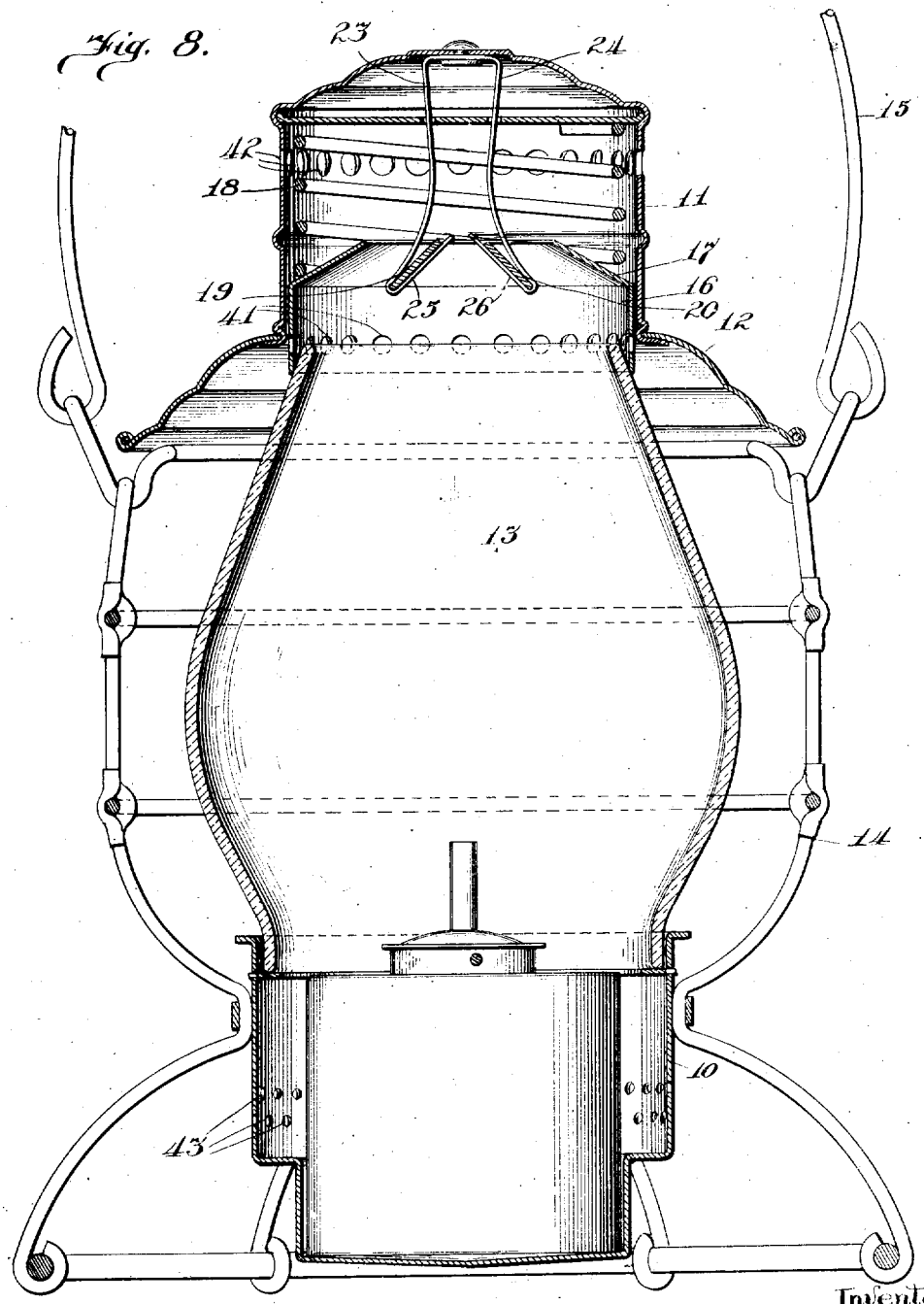

Figure 1 is a side elevation of a lantern, partly in vertical section; Fig. 2 is a plan view of the globe-holder and ventilating cap; Fig. 3 is a plan view of the same part showing a modified form of construction, a portion being broken away; Fig. 4 is a sectional view on the line 4—4 of Fig. 3; Figs. 5 and 6 are perspective views of the baffle plates shown in Fig. 3; Fig. 7 is a perspective of a modified form of baffle plate; and Fig. 8 is a vertical central section of the lamp.

The lantern comprises a base ring 10 within which the font may be seated, a dome 11 having at its base an annular flange 12, a globe 13 interposed between the base ring and the dome, a guard-frame 14 shown as of wire and serving to unite the base ring and dome, and a bail 15.

The upper end of the globe 13 is engaged by a globe-holding cap 16, annular in form and having at its upper end an instanding and upwardly-inclined flange 17, taking the form of a truncated cone and being centrally apertured to permit the egress of vapors from within the globe.

The external diameter of the cap 16 is slightly less than the internal diameter of the dome 11 within which it loosely fits and slides vertically. An expansion coiled spring 18 reacts between the top of the cap and the top of the dome to force the cap downwardly upon the globe, the upper end of which enters within the cap.

In the construction of Figs. 1 and 2 a pair of baffle plates 19, 20, is located within the cap 16, one plate on each side of one of its diameters, the two plates being set so that they incline toward each other from below upwardly, and they are preferably held in place by means of lugs 21, 22, formed on their ends and projecting through suitable slots cut in the cap flange 17, and being then turned downwardly against the surface of the flange.

In order to retain the cap within the dome a pair of fingers 23, 24, depend from the top of the dome 11, their lower ends being bent to hook form, as shown at 25, 26, to loosely engage the plates 19, 20. The fingers 23, 24, are of spring metal, and as the cap 16 is pushed upwardly they bend outwardly under the influence of the plates 19, 20, which slide freely within their hook portions.

In the construction illustrated in Figs. 3 and 4, there are present four baffle plates 27, 28, 29 and 30, arranged in two pairs set at right angles each to the other, one pair of plates being slotted from their upper edges obliquely downward, as shown at 31, and the other pair being slotted obliquely upward from their lower edges, as shown at 32, in order that the two sets may be fitted together. Each of these plates is provided at its ends with lugs 33, 34, adapted to enter suitable slots in the cap flange 17 and to be overturned to secure the plates within the cap.

If preferred a pair of baffle plates, as 35, 36, may be stamped up out of a single plate of metal, in that case being united at their ends by web portions 37, 38, from which may be stamped up lugs 39, 40, for securing the plates within the cap flange.

The lower end of the cap 16 projects below the lower end of the dome 11, this projecting portion being provided with an annularly arranged series of apertures 41 to permit an inflow of air. The side walls of the dome 11 are perforated above the cap 16, as shown at 42, to permit the escape of vapors from the interior of the lantern, and the base ring 10 is apertured, as shown at 43, to admit air to maintain combustion.

Great difficulty has been encountered in providing a lantern for railway service within which there may be maintained a substantially uniform flame under the widely diverse conditions encountered. The lantern is sometimes used within a car where there are no drafts; is sometimes carried in such a way that it is subjected to very slight drafts; sometimes it is exposed to a breeze of very high velocity, owing not only to the movement of the air but to the movement of the train in a direction opposite to that from which the wind is blowing; and it is also subjected to severe tests in signaling, involving rapid changes of angular position with reference to the vertical, and when carried on the top of a rapidly moving train may be inclined forward owing to the stooping posture of the user. It is found in practice that a lantern which will endure the action of a high wind may have its flame smothered when there is no external movement of air, and again, unless properly made, the light may be extinguished by the action of slowly moving air currents, although it will be maintained either in a high wind or when there is no movement of air whatever.

To insure good combustion when the wind is not blowing, the dome must be well ventilated to permit the vapors to freely escape. This ventilation, however, permits the air to enter the dome freely when the wind is blowing, and these air currents may either blow out the light or check the outflow of vapors and thus smother it.

In the lantern here shown and described, air currents entering the apertures 42 at an angle to the baffle plates are prevented by the latter from being directed downwardly upon the flame, but, striking the outer face of the first of these baffle plates to be encountered, will be broken up and deflected upwardly, or downwardly along the inner surface of the globe 13 and thus away from the flame. These downwardly-directed currents will reach the flame laterally and stimulate combustion, and will also tend to force the vapors upwardly at the opposite side of the globe. The baffle plates being substantially edgewise to the direction of the upward movement of the vapors, present practically no obstacle to their free egress, even when the draft is not thus stimulated, as they leave the aperture of the flange 17 substantially unobstructed.

When two sets of baffle plates are employed, as shown in Figs. 3 and 4, provision is made for controlling the air currents from whichever direction they may enter the dome.

The apertures 41 in the lower portion of the walls of the cap 16 permit air to enter from without, and when there are no pronounced air currents such inflow is stimulated by the upwardly-moving vapors and tends to reduce their temperature and consequently to retard their movement, and also to prevent the upper end of the globe and the dome from becoming unduly heated. As these apertures are located under and are protected by the flange 12, there will be but slight increase in the inflow of air by reason of wind pressure, but, on the contrary, some of the air entering through the dome apertures, and being deflected downwardly and outwardly by the baffle plates, will make its escape through these cap apertures, thus reducing the pressure within the globe.

In the giving of certain signals, particularly the swinging of the lantern through a circle substantially in horizontal plane, the signal universally employed on railroads for the backing of a train, the air currents appear to be reversed, the air entering at the top and moving downwardly. This movement carries downwardly upon the flame the vitiated air and causes it to die down or lose its vitality, and if the movement is continued for a considerable time the flame may be entirely extinguished. This signal is usually followed by another in which the lantern is swung to and fro in a substantially vertical plane, and may be given a rapid motion, this being the signal universally employed for stopping the train. If, when this stopping signal is given, the flame is weak it is apt to be entirely extinguished. This dimming and extinguishing of the flame is, of course, due to the absence of oxygen. By perforating the globe-holding cap at its lower end to permit the ingress of air below the dome, this tendency to weaken the flame is decreased by bringing to it quickly a supply of air from above, and the danger of extinguishing the flame in the manner above described is entirely overcome.

I am aware that so-called tubular lanterns, in which the air for supporting combustion is introduced into the base of the lantern and into a chamber therein separated from the combustion chamber except by the outlet for the flame, and in which the burner is covered by a shield or dome having imperforate walls and slotted across its top to accommodate the flame, have been provided with a series of ports immediately above the septum separating the air chamber in the base from the flame chamber, and with a series of ports in the base of the dome of the lantern and immediately above the globe, as exemplified in the patent to Betts, No. 920,815, issued May 4th, 1909. I do not, therefore, broadly claim a lantern having air ports at the top and bottom of the globe. In the tubular lanterns the conditions affecting lanterns of the type herein described and illustrated in the accompanying drawings, as hereinbefore set forth, are not encountered for the reason that any motion of the lantern which tends to reverse the air currents within its body will have the tendency to accelerate the flow of air downwardly through the tubes and hence to stimulate the combustion. Furthermore, in a tubular lantern any air which may enter the ports at the upper end of the globe has no effect in supporting combustion, for the reason not only that it is adequately sustained by the air supplied to the tubes, but the burner is inclosed by the dome with imperforate walls and therefore not accessible to air currents from above. In a tubular lantern, in so far as the supplemental ports at the base of the globe and above the air chamber serve any useful purpose under the conditions as hereinbefore recited, it is merely for the escape of the products of combustion, the outflow of which through the dome of the lantern may be retarded in the giving of signals.

I claim as my invention—

1. In a lantern, in combination, a body, a dome above the body, and open thereto, and baffle plates crossing the interior of the base of the dome and being inclined outwardly from the axis thereof from above.

2. In a lantern, in combination, a body, a dome above the body and open thereto, and baffle plates located within the dome and on opposite sides of its vertical axis and being inclined outwardly and downwardly.

3. In a lantern, in combination, a body, a dome above the body and open thereto, and baffle plates within the dome and arranged in pairs at angles to each other, the members of each pair being on opposite sides of the vertical axis of the dome and being inclined outwardly and downwardly.

4. In a lantern, in combination, a body, a dome above the body and open thereto, a globe-holding cap slidable within the dome and having an instanding flange at its upper end, and baffle plates crossing the interior of the cap and being inclined downwardly and outwardly.

5. In a lantern, in combination, a body, a dome above the body and open thereto, a globe-holding cap slidable within the dome, and baffle plates crossing the interior of the cap and being inclined downwardly and outwardly.

6. In a lantern, in combination, a body, a dome above the body and open thereto, a globe-holding cap slidable within the dome and having an instanding flange at its upper end, and baffle plates crossing the interior of the cap and being arranged in pairs, the members of each pair being on opposite sides of the vertical axis of the dome and being inclined outwardly and downwardly.

7. In a lantern, in combination, a body, a dome above the body and open thereto, a globe-holding cap slidable within the dome and having an instanding flange at its upper end, and baffle plates crossing the interior of the cap and being arranged in pairs set at an angle to each other, the members of each pair being on opposite sides of the vertical axis of the dome and being inclined outwardly and downwardly.

8. In a lantern, in combination, a body, a dome above the body and open thereto, a globe-holding cap slidable within the dome and extending below the same and having an annular series of apertures adjacent its lower end and an instanding flange at its upper end, and baffle plates crossing the interior of the cap and being inclined downwardly and outwardly.

9. In a lantern, in combination, a globe, a dome thereon, a hollow truncated cone within the dome, and baffle plates within the cone and being inclined downwardly and outwardly from the axis thereof.

10. In a lantern, in combination, a globe, a dome thereon, a hollow truncated cone within the dome, its base opening directly to the globe, and baffle plates within the cone and being inclined downwardly and outwardly.

11. In a lantern, in combination, a base ring having air induction ports for supporting combustion, such ports opening directly to the external atmosphere and to the flame chamber of the lantern, a burner above the base ring and being exposed laterally to the flame chamber of the lantern, a globe above the base ring, a dome above the globe and having eduction ports at its upper end, a series of induction ports adjacent its lower end and an instanding annular flange between the last two named series of ports.

12. In a lantern, in combination, a base ring having air induction ports for supporting combustion, such ports opening directly to the external atmosphere and to the flame chamber of the lantern, a burner above the base ring and being exposed laterally to the flame chamber of the lantern, a globe above the base ring, a dome above the globe and having eduction ports at its upper end, and a globe-holding ring within the dome and associated therewith and having at its lower end a series of induction ports and having an instanding annular flange above its ports.

WILLIAM S. HAMM.

Witnesses:

LOUIS K. GILLSON,

E. M. KLATCHER.